United States Patent
Hao

(10) Patent No.: US 11,670,107 B2
(45) Date of Patent: Jun. 6, 2023

(54) FINGERPRINT UNLOCKING METHOD AND ELECTRONIC DEVICE, AND STORAGE MEDIUM

(71) Applicant: Beijing Xiaomi Mobile Software Co., Ltd., Beijing (CN)

(72) Inventor: Ning Hao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/681,099

(22) Filed: Feb. 25, 2022

(65) Prior Publication Data
US 2023/0047475 A1 Feb. 16, 2023

(30) Foreign Application Priority Data
Aug. 9, 2021 (CN) .......................... 202110910443.4

(51) Int. Cl.
*G06V 40/13* (2022.01)
*G06V 40/12* (2022.01)
*G06F 21/32* (2013.01)

(52) U.S. Cl.
CPC ...... *G06V 40/1318* (2022.01); *G06V 40/1365* (2022.01); *G06F 21/32* (2013.01)

(58) Field of Classification Search
None
See application file for complete search history.

(56) References Cited

U.S. PATENT DOCUMENTS

| | | | |
|---|---|---|---|
| 2004/0101174 A1* | 5/2004 | Sato | G06V 40/1365 713/186 |
| 2016/0019673 A1 | 1/2016 | Sakamoto | |
| 2021/0056286 A1* | 2/2021 | Cheng | G06F 1/3265 |

FOREIGN PATENT DOCUMENTS

| | | | | |
|---|---|---|---|---|
| JP | 2006-172258 A | 6/2006 | | |
| WO | WO-2014136369 A1 * | 9/2014 | ......... | G06K 9/00013 |

OTHER PUBLICATIONS

Extended European Search Report dated Jul. 21, 2022 for European Patent Application No. 22158961.7.

* cited by examiner

*Primary Examiner* — Joseph R Haley
(74) *Attorney, Agent, or Firm* — Volpe Koenig

(57) ABSTRACT

A fingerprint unlocking method, includes obtaining a fingerprint image through an optical fingerprint sensor of an electronic device when a user performs fingerprint unlocking on the electronic device; obtaining an extended fingerprint image by performing fingerprint extending processing on the fingerprint image according to a preset curvature; and unlocking the electronic device if the extended fingerprint image matches a preset fingerprint image.

18 Claims, 7 Drawing Sheets

FINGERPRINT UNLOCKING METHOD AND ELECTRONIC DEVICE, AND STORAGE MEDIUM

CROSS REFERENCE TO RELATED APPLICATION

The application is based on and claims priority to Chinese Patent Application No. 202110910443.4, filed to the Chinese Patent Office on Aug. 9, 2021, the entire contents of which are incorporated herein by reference.

BACKGROUND

With the continuous development of fingerprint verification technologies, more and more electronic devices can be unlocked through fingerprints.

SUMMARY

The disclosure relates to the field of liquid crystal display screen display, and in particular to a fingerprint unlocking method and apparatus, an electronic device and a storage medium.

According to a first aspect of examples of the disclosure, a fingerprint unlocking method is provided, and includes:

obtaining a fingerprint image through an optical fingerprint sensor of an electronic device when a user performs fingerprint unlocking on the electronic device;

performing fingerprint extending processing on the fingerprint image according to a preset curvature to obtain an extended fingerprint image; and unlocking the electronic device if the extended fingerprint image matches a preset fingerprint image.

According to a second aspect of examples of the disclosure, an electronic device is provided, and includes: a processor; a memory, used to store instructions executable by the processor; and an optical fingerprint sensor, used to collect a fingerprint image; where the processor is configured to:

control the optical fingerprint sensor of the electronic device to obtain the fingerprint image when a user performs fingerprint unlocking on the electronic device; obtain an extended fingerprint image by performing fingerprint extending processing on the fingerprint image according to a preset curvature; and unlock the electronic device when the extended fingerprint image matches a preset fingerprint image.

According to a third aspect of examples of the disclosure, a non-transitory computer readable storage medium is provided, on which a computer program instruction is stored, where when the program instruction is executed by a processor, steps of the fingerprint unlocking method provided by the first aspect of the disclosure are realized.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

Figure 1:
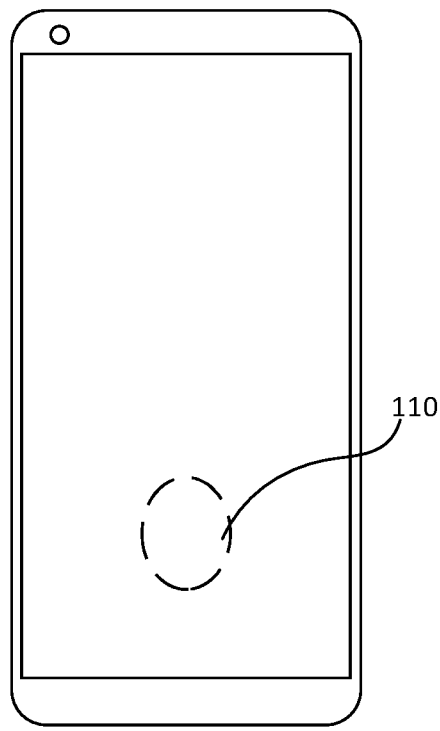
FIG. 1 is a schematic diagram of an application environment of a fingerprint unlocking method according to an example.

Examples will be described in detail herein, examples of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of an apparatus and a method consistent with some aspects of the disclosure as detailed in the appended claims.

With wider and wider application of fingerprints, fingerprint unlocking technologies are also developing rapidly and more and more electronic devices can be unlocked through fingerprints. Generally, a fingerprint sensor configured in an electronic device can identify a fingerprint of a user and verify the fingerprint of the user, and after the verification is passed, the unlocking is completed and the user is allowed to operate the electronic device, avoiding the electronic device being operated by strangers and ensuring the security of the electronic device. In the related art, the fingerprint sensor has been developed into an optical fingerprint sensor. Through the optical fingerprint sensor, a finger of the user does not need to press completely to a screen of the electronic device. By irradiating the fingerprint with light, and collecting a light ray reflected from the fingerprint, the electronic device can get a plane fingerprint image of the fingerprint. Optical fingerprint sensors are gradually replacing traditional capacitive sensors. Compared to the capacitive sensors, the optical fingerprint sensors do not require a finger to be pressed on a fingerprint collecting area extensively, but need to irradiate a fingerprint with light and receive a projection of a light ray reflected from the fingerprint on the fingerprint collecting area to generate a fingerprint image. The process that users need to press the fingerprint collecting area extensively for a long time is avoided, consequently, the time for fingerprint collection is greatly reduced, and user experience is improved.

However, in the related art, a plane fingerprint image collected through the optical fingerprint sensor is an image of a fingerprint of the user projected directly onto a screen of an electronic device, which is equivalent to collecting the fingerprint of the user as a purely plane image. However, a human finger is not a completely plane surface, a finger belly is a sphere-like curved body, and this curved sphere-like body may be extended in a specific way, and the fingerprint image obtained when the spherical image is extended is equivalent to the fingerprint image collected by the traditional capacitive fingerprint sensor, and the extended fingerprint image is not the same as the purely plane image collected through the optical fingerprint sensor. Compared with the extended fingerprint image, the purely plane image is prone to being collected and copied illegally, and consequently, the security of fingerprint unlocking cannot be guaranteed.

In view of this, the disclosure provides a fingerprint unlocking method and apparatus, an electronic device, and a storage medium, which ensure security of fingerprint unlocking while improving a speed of fingerprint unlocking by introducing a preset curvature to extend a fingerprint image based on the fingerprint image collected through an optical fingerprint sensor and performing fingerprint unlocking verification through the extended fingerprint image.

An application environment of a fingerprint unlocking method provided by the disclosure is described below. As shown in FIG. 1, the fingerprint unlocking method may be applied to an electronic device 100. Specifically, the electronic device 100 may be a smartphone. The electronic device 100 may be configured with an under-screen fingerprint identification module 110 and a processor (not shown in the figure). The under-screen fingerprint identification module 110 is used to collect a fingerprint image of a user, and the processor can control the under-screen fingerprint identification module 110, process the fingerprint image collected by the under-screen fingerprint identification module 110 and unlock the electronic device 100, etc.

Figure 2:
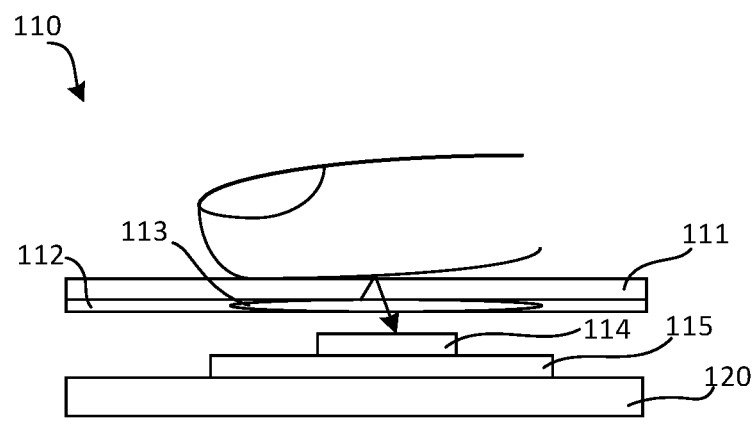
FIG. 2 is a schematic structural diagram of an under-screen fingerprint identification module according to an example.

As shown in FIG. 2, the under-screen fingerprint identification module 110 may include: a light source apparatus 113, an optical fingerprint sensor 114, CG (Curved Glass) 111, an OLED screen 112, and a fingerprint module reinforcement steel sheet 115, where the CG 111 may be arranged on an upper layer of the OLED screen 112, and the CG 111 is used to be in contact with a finger of the user. The light source apparatus 113 may be arranged in the OLED screen 112, and the light source apparatus 113 is configured to form a light spot to irradiate the finger that is in contact with the screen with light. The optical fingerprint sensor 114 may be arranged on the fingerprint module reinforcement steel sheet 115, and the optical fingerprint sensor 114 is used to receive a light ray reflected back from the finger to form a fingerprint image. The fingerprint module reinforcement steel sheet 115 may be fixed to an entire middle frame 120 of the electronic device.

An area, corresponding to the screen of the electronic device 100, of the under-screen fingerprint identification module 110 may be used as a fingerprint collecting area.

Figure 3:
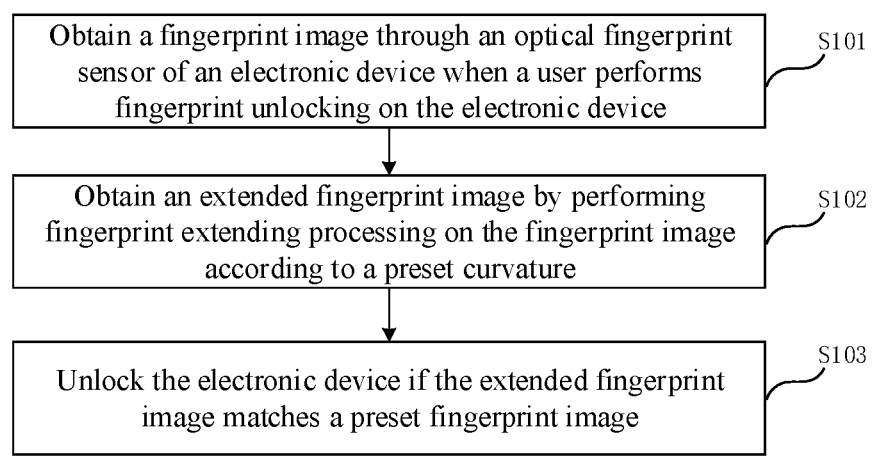
FIG. 3 is a flow diagram of a fingerprint unlocking method according to an example.

FIG. 3 is a flow diagram of a fingerprint unlocking method according to an example. As shown in FIG. 3, the fingerprint unlocking method may be used in the electronic device 100 as shown in FIG. 1, and includes the following steps:

In step S101, when a user performs fingerprint unlocking on the electronic device, a fingerprint image is obtained through an optical fingerprint sensor of the electronic device.

The fingerprint image may be a picture that includes fingerprint lines.

In some implementations, when the electronic device detects that a finger of the user touches a fingerprint collecting area of a screen of the electronic device, it can be determined that the user needs to perform fingerprint unlocking. At this time, a light source apparatus is activated to emit bright light to form a light spot, and a light ray of the light spot is irradiated to the fingerprint of the finger and reflected from the fingerprint of the finger to the optical fingerprint sensor, and the reflected light is collected through the optical fingerprint sensor to form the fingerprint image.

In step S102, an extended fingerprint image is obtained by performing fingerprint extending processing on the fingerprint image according to a preset curvature.

The preset curvature may be a pre-measured curvature of the finger of the user, which has a certain curvature since a finger belly may be considered as a curved body.

It is understood that because the fingerprint is distributed on the curved body of the finger, if the curvature of the curved body changes, then a surface, on which the fingerprint is distributed, of the curved body will be extended into a plane, and a deformation quantity of the fingerprint distributed on the surface will also change, leading to the formed fingerprint image changing.

In some implementations, the preset curvature may be measured in advance for the finger of the user and stored in a local memory of the electronic device. After obtaining the fingerprint image, the electronic device may recall the preset curvature from the local memory to perform the extending processing on the fingerprint image to obtain the extended fingerprint image. The specific extending manner may be a Mercator 2D extending manner. The Mercator 2D extending manner may be referred to an extending manner using the Earth as an example. Specifically, assuming that the Earth is enclosed in a hollow cylinder, of which a reference latitude line is tangential (equatorial) to the cylinder in contact, and then assuming that a lamp in the center of the Earth projects a figure on the sphere onto the cylinder, and then the cylinder is extended.

In step S103, if the extended fingerprint image matches a preset fingerprint image, the electronic device is unlocked.

The preset fingerprint image may be a fingerprint image entered by the user before this unlock, which is also the fingerprint image obtained after being collected through the optical fingerprint sensor then processed by the preset curvature for the fingerprint extending process.

In some implementations, the preset fingerprint image may be pre-entered into the local memory of the electronic device, and after the extended fingerprint image is obtained, the electronic device may recall the preset fingerprint image from the electronic device and compare the extended fingerprint image with the preset fingerprint image. If the comparison result is that the extended fingerprint image is consistent with the preset fingerprint image, the extended fingerprint image is determined to match the preset fingerprint image, and the electronic device is unlocked.

Alternatively or additionally, the preset curvature and preset fingerprint image may also be stored in advance in a cloud server in communication with the electronic device, and the electronic device may send an obtaining request to the cloud server to instruct the cloud server to feed back the preset curvature and preset fingerprint image.

In this example, when the user performs fingerprint unlocking on the electronic device, the fingerprint image is obtained from the optical fingerprint sensor of the electronic device, the fingerprint extending processing is performed on the fingerprint image according to the preset curvature to obtain the extended fingerprint image, and if the extended fingerprint image matches the preset fingerprint image, the electronic device is unlocked. In this way, curvature parameters are introduced on the basis of a two-dimensional plane fingerprint image for extending, this extended fingerprint image may be regarded as performing spherical extending on a three-dimensional curved surface of the fingerprint with deformation quantities, and these deformation quantities are difficult to be imitated by the plane fingerprint, so the extended fingerprint image has a high anti-counterfeiting capability, and the unlocking security can be ensured by performing unlocking verification through the extended fingerprint image. In addition, compared to traditional capacitive sensors, the user does not need to press the finger on the screen extensively for fingerprint identification, and need to partially touch the screen, so that the time for fingerprint unlocking is greatly reduced, and user experience is improved.

Figure 4:
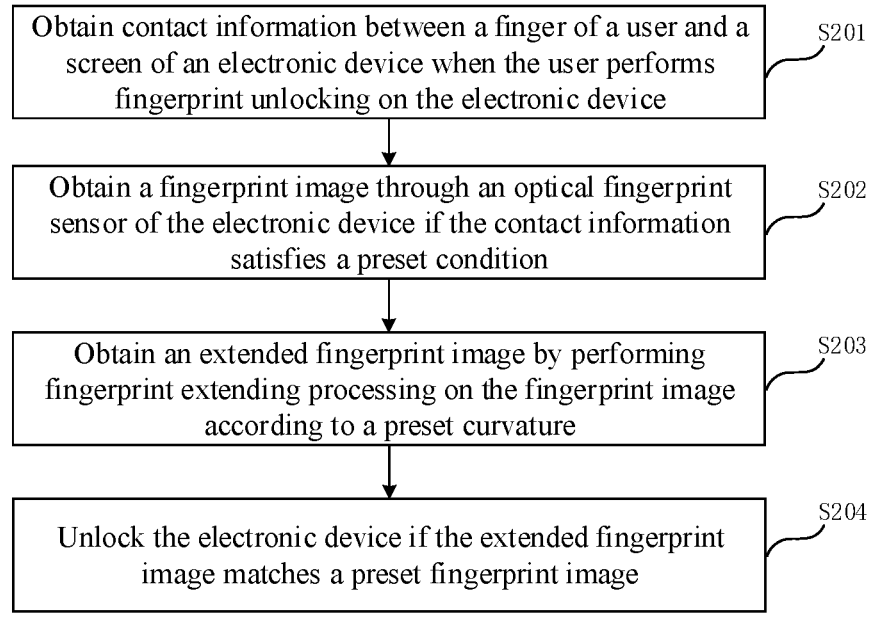
FIG. 4 is a flow diagram of a fingerprint unlocking method according to another example.

FIG. 4 is a flow diagram of a fingerprint unlocking method according to another example. As shown in FIG. 4, the fingerprint unlocking method is used in the above electronic device, and includes the following steps:

In step S201, when the user performs fingerprint unlocking on the electronic device, contact information between the finger of the user and the screen of the electronic device is obtained.

In some implementations, the electronic device may determine that the user is performing fingerprint unlocking on the electronic device when the electronic device detects that pressure on the fingerprint collecting area exceeds a pressure threshold value, and then detects the contact information between the finger of the user and the screen of the electronic device. Alternatively or additionally, the contact information may include a contact area, a contact duration, contact strength, etc.

The fingerprint collecting area of the electronic device may be configured with a pressure sensor to detect the contact strength. A processor of the electronic device may start timing when the contact strength exceeds the pressure threshold value and calculate the contact duration based on the duration of the contact strength exceeding the pressure threshold value.

The fingerprint collecting area of the electronic device is configured with a distance sensor array, which may be used to collect a distance between a surface of the fingerprint of the user and the screen of the electronic device, and the electronic device may use the distance sensor whose detected distance in the distance sensor array is smaller than a distance threshold value as a target distance sensor, and the area formed by the target sensor, as the contact area. As an instance, for example, the distance sensor array includes a distance sensor 1, a distance sensor 2, a distance sensor 3 . . . a distance sensor 10 evenly distributed on the screen of the electronic device, and if the distance sensor 2 to the distance sensor 5 in the distance sensor array detect a distance smaller than the distance threshold value, an area enclosed by the distance sensor 2 to the distance sensor 5 on the screen is taken as the contact area.

In step S202, if the contact information satisfies a preset condition, the fingerprint image is obtained through the optical fingerprint sensor of the electronic device.

The preset condition is used to determine whether this finger touch of the user is a valid touch. If the contact information satisfies the preset condition, it is determined that this finger touch of the user is a valid touch, and at this time, the electronic device can turn on the optical fingerprint sensor and collect fingerprint information through the optical fingerprint sensor.

In some implementations, the contact information includes the contact area, and a specific implementation of step S202 may include:

If the contact area is greater than or equal to an area threshold value, it is determined that the contact information satisfies the preset condition. The area threshold value is smaller than a contact area when the finger of the user is in full contact with the screen. If the electronic device detects that the contact information satisfies the preset condition, it turns on the optical fingerprint sensor to obtain the fingerprint image of the finger of the user.

The area threshold value may be pre-stored in a memory of the electronic device. The electronic device may recall the area threshold value from the memory, and compare the obtained contact area and the area threshold value. If the contact area is greater than or equal to the area threshold value, it is determined that the contact information satisfies the preset condition.

It is understood that the contact area when the finger of the user is in full contact with the screen may be taken as a maximum area that the finger of the user can be in contact with the screen when pressed on it.

Alternatively or additionally, the area threshold value may be equal to the maximum area multiplied by a specified ratio, which does not exceed 100%. Alternatively or additionally, the specified ratio may be smaller than or equal to 50%. For example, the area threshold value may be 50%, 30%, 10%, etc. of the maximum area, with the specific specified ratio not being limited here.

In this implementation, by determining that the contact information satisfies the preset condition when the contact area is greater than or equal to the area threshold value, it is possible to ensure that this touch of the user is a valid touch and avoid the user from turning on the optical fingerprint sensor by mistakenly touching the screen of the electronic device. In addition, the area threshold value is smaller than the maximum area that the finger of the user can be in contact with the screen when pressing on the screen, and may specifically be smaller than 50% of the maximum area, being able to reduce the difficulty of triggering the optical fingerprint sensor, avoiding the process that the user needs to press the screen extensively for a long time, and improving the collecting speed and efficiency of the fingerprint image.

In other implementations, the contact information further includes a contact duration, and a specific implementation of step S202 may include:

If the contact area is greater than or equal to the area threshold value and the contact duration is greater than or equal to a duration threshold value, it is determined that the contact information satisfies the preset condition.

The electronic device may start timing when it detects that the contact area between the finger of the user and the screen is greater than or equal to the area threshold value, obtaining the contact duration. When the contact duration is greater than or equal to the duration threshold value, it can be determined that the contact information satisfies the preset condition. During the timing process, if the contact area changes and becomes smaller than the area threshold value, it is determined that the contact information does not satisfy the preset condition.

Considering that the user touches the screen for a short period of time, which is likely to be caused by mistakenly touching, in this implementation, it is determined that the contact information satisfies the preset condition when the contact area is greater than or equal to the area threshold value and the contact duration is greater than or equal to the duration threshold value, further ensuring that the touch of the user is a valid touch and avoiding the waste of power consumption caused through the optical fingerprint sensor being turned on by mistakenly touching.

It can be understood that in this example, the contact area between the finger of the user and the screen refers to a contact area between the screen corresponding to the fingerprint obtaining area and the finger.

In step S203, the extended fingerprint image is obtained by performing the fingerprint extending processing on the fingerprint image according to the preset curvature.

In some implementations, a specific implementation of step S203 may include: the fingerprint extending processing is performed on the fingerprint image according to the preset curvature and a Mercator algorithm to obtain the extended fingerprint image.

As an instance, an extending process may be specified as: the electronic device obtains coordinate information, corresponding to a preset rectangular coordinate system, of the fingerprint image, where the preset rectangular coordinate system is pre-established on the screen of the electronic device. When the fingerprint of the user is projected on the screen of the electronic device, the optical fingerprint sensor obtains the coordinate information of a point in the rectangular coordinate system according to the point, projected on the screen, of the fingerprint, because the rectangular coordinate system is established on the screen in advance. Then, the coordinate information and the preset curvature are substituted into an inverse of the Mercator algorithm for calculation processing to obtain a longitude and a latitude corresponding to the coordinate information, i.e., the extended latitude and the extended longitude. Finally, the extended fingerprint image is constructed based on the extended latitude and the extended longitude, and the construction process is equivalent to constructing a plane map based on latitude and longitude on the earth.

Specifically, the fingerprint image may be extended by the following Mercator projection equation:

$$B = \frac{\pi}{2} - 2\arctan\left(\text{EXP}^{-\frac{X}{K}} \times \text{EXP}^{-\frac{e}{2}\ln\left(\frac{1-e\sin B_0}{1+e\sin B_0}\right)}\right);$$

$$L = \frac{Y}{K} + L_0;$$

where B is the latitude of the fingerprint image after extending, L is the longitude of the fingerprint image after extending, X is a horizontal coordinate of the fingerprint in the preconstructed rectangular coordinate system on the screen of the electronic device, Y is a vertical coordinate of the fingerprint in the preconstructed rectangular coordinate system on the screen of the electronic device, e is an eccentricity, $B_0$ is an initial value of a latitude, i.e., the latitude of the origin, $L_0$ is an initial value of a longitude, i.e., the longitude of the origin, K is the preset curvature, and EXP is a natural logarithmic base.

Figure 5:
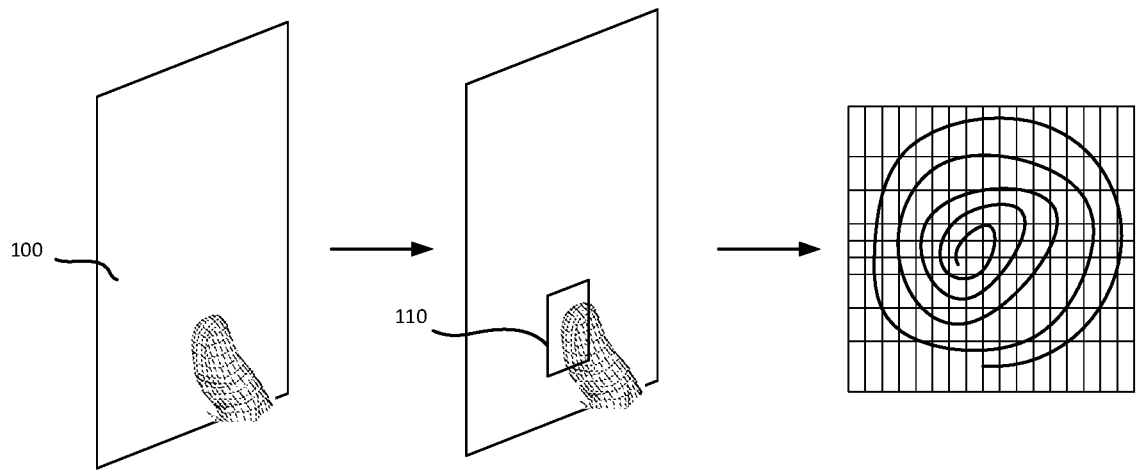
FIG. 5 is a schematic diagram of entry processing of a fingerprint image according to an example.

As an instance, entry processing of the fingerprint image may be as shown in FIG. 5. When the finger touches the screen of the electronic device 100, specifically touching the under-screen fingerprint identification module 110 of the electronic device, i.e., the fingerprint collecting area, the electronic device may turn on the optical fingerprint sensor of the under-screen fingerprint identification module 110 to collect the fingerprint image. The opening of the optical fingerprint sensor does not require the finger belly of the finger to completely cover the fingerprint collecting area, and as long as the contact area between the finger and the screen is greater than the area threshold value, a fingerprint image collecting function of the optical fingerprint sensor can be opened. During the fingerprint image collecting, a part of the finger that touches the screen may be defined as an equatorial area, and parts of the finger that does not touch the screen, i.e., the non-contact part, may be defined as a low-latitude area and a high-latitude area. Since the finger belly of the finger has spherical curvature characteristics, it can be set as the low-latitude area and the high-latitude area according to according to the near and far distances between the finger and the screen collected by the distance sensor. Specifically, the area close to the distance sensor is defined as the low-latitude area, such as an area where the distance sensor detects that the distance between the finger and the screen is smaller than or equal to a first distance threshold value. Alternatively, the area away from the distance sensor is defined as the high-latitude area, such as an area where the distance sensor detects that the distance between the finger and the screen is greater than a second distance threshold value. The first distance threshold value is smaller than or equal to the second distance threshold value. The collected fingerprint image may be Mercator extended by the above formula to obtain the extended fingerprint image since the longitude and the latitude are defined and the screen may be predefined with horizontal and vertical coordinates.

Figure 6:
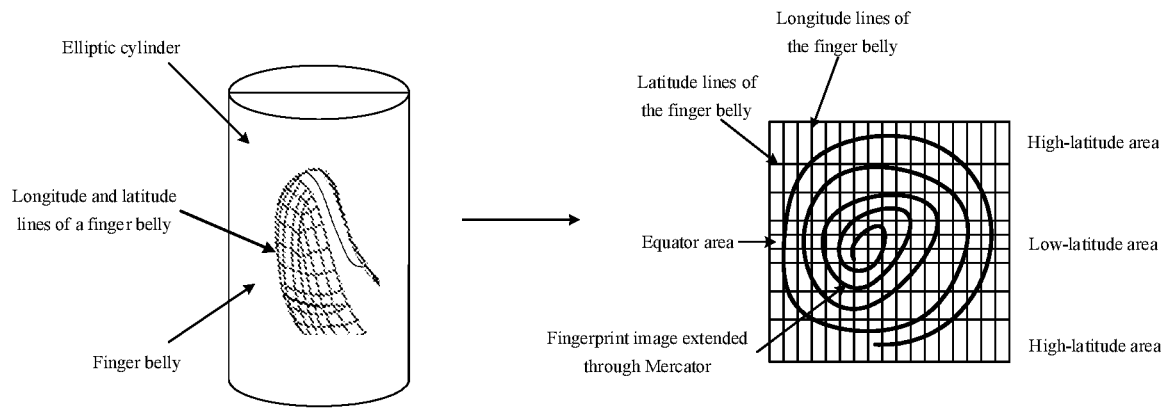
FIG. 6 is a schematic diagram of a principle of extending a fingerprint image through a Mercator cylinder according to an example.

A principle of extending the fingerprint image through a Mercator cylinder can be shown in FIG. 6. Before extending, a cylinder surrounds the finger, and then a spherical curved surface of the finger may be extended with a side surface of the cylinder. Specifically, corresponding longitude and latitude lines are set on the spherical curved surface of the finger, and a position where a center protuberance of the finger belly is tangent to the side surface of the cylinder is the equatorial area. Due to the characteristics of the spherical curved surface of the finger belly, a direction away from the finger belly will be farther and farther from the side surface of the cylinder, and the farther the area is set, the higher the latitude. From the above formula, dimensional deformation of the equatorial area is the smallest, and the deformation of the area with higher latitude is larger. The final fingerprint image obtained after extending by the preset curvature and the Mercator algorithm may be as the fingerprint image in FIG. 6, in which the fingerprint image after extending may be represented by the longitude and latitude lines. These different latitudes result in the deformation quantities of the fingerprint image after extending, i.e., it may be used as an anti-counterfeit design in the fingerprint unlocking method of this example. The curvature may be set by the algorithm and may be adjusted arbitrarily within a certain range. When the curvature is larger, the deformation quantity of the fingerprint image shape of the same latitude will also be larger, and these variations can be produced after being pressed by the finger with a certain spherical curvature, while the plane fingerprint image cannot produce the high and low latitudes respectively. It can effectively increase the difficulty of anti-counterfeiting and enhance the security of fingerprint unlocking.

Figure 7:
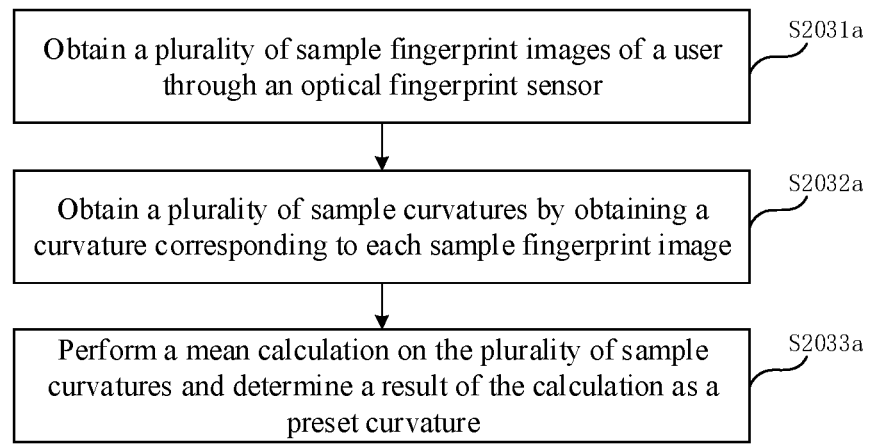
FIG. 7 is a flow diagram of an implementation of step 5203 illustrated according to the example of FIG. 4.

In some implementations, as shown in FIG. 7, the preset curvature in step S203 may be obtained as follows:

Step S2031a, a plurality of sample fingerprint images of the user are obtained through the optical fingerprint sensor.

At a stage of fingerprint entry performed by the user on the electronic device, the electronic device may guide the user to make a plurality of fingerprint entries through a preset fingerprint entry interface, obtaining the plurality of sample fingerprint images of the user through the optical fingerprint sensor.

Step S2032a, a plurality of sample curvatures is obtained by obtaining a curvature corresponding to each sample fingerprint image.

The electronic device may be preconfigured with a curvature database, which may include a plurality of standard fingerprint images, and mapping relationships between the plurality of sample curvatures and the plurality of standard fingerprint images. For example, a table of mapping relationships between the plurality of sample curvatures and the plurality of standard fingerprint images may be shown in Table 1:

TABLE 1

| Standard fingerprint image | Sample curvature |
| --- | --- |
| Standard fingerprint image a | Sample curvature a |
| Standard fingerprint image b | Sample curvature b |
| Standard fingerprint image c | Sample curvature c |

The electronic device may compare each sample fingerprint image with the plurality of standard fingerprint images for similarity, find the standard fingerprint image matching each sample fingerprint image, and determine the sample curvature corresponding to the standard fingerprint image matching it as the sample curvature corresponding to that sample fingerprint image.

For example, if similarity between the sample fingerprint image a and the standard fingerprint image b is greater than a similarity threshold value, the sample fingerprint image a can be determined to match the standard fingerprint image b, and the sample curvature b, corresponding to the standard fingerprint image b, can be determined to be the sample curvature corresponding to the sample fingerprint image a. Similarly, the sample curvature corresponding to each sample fingerprint image can be found in the product function curvature database by the above way.

Step S2033a, a mean calculation is performed on the plurality of sample curvatures, and a result of the calculation is determined as the preset curvature.

For example, if the plurality of sample curvatures include the sample curvature a, the sample curvature b, and the sample curvature c, a sum of the sample curvature a, the sample curvature b, and the sample curvature c can be calculated and then divided by 3 to obtain the mean value of the sample curvature a, the sample curvature b, and the sample curvature c, and the mean value is determined as the preset curvature.

Considering that fingers of some user are plump while fingers of other users are slim, so curvatures of curved bodies of the fingers are also different. In this implementation, the optical fingerprint sensor obtains the plurality of sample fingerprint images of the user, and obtains the curvature corresponding to each sample fingerprint image to obtain the plurality of sample curvatures, then performs the mean calculation on the plurality of sample curvatures, and determines the calculation result as the preset curvature. It can accurately and automatically match an exclusive curvature for the user as the preset curvature, which improves the efficiency of preset curvature setting and enhances user experience.

Figure 8:
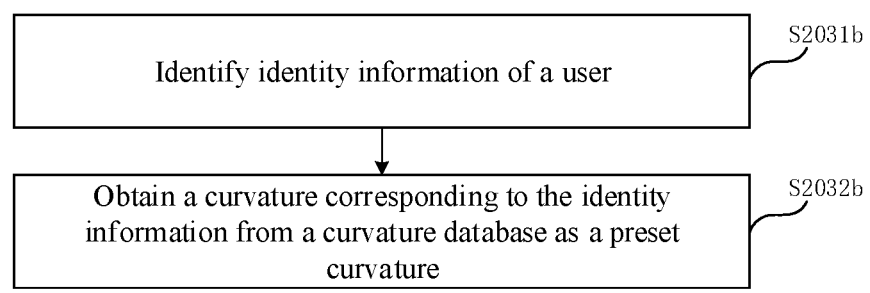
FIG. 8 is a flow diagram of another implementation of step 5203 illustrated according to the example of FIG. 4.

In other implementations, as shown in FIG. 8, the preset curvature in step S203 may be obtained as follows:

Step S2031b, identity information of the user is identified.

For example, the electronic device may obtain user characteristics of the user to identify identity characteristics of the user. Alternatively or additionally, the user characteristics may include facial characteristics, voice characteristics, iris characteristics, etc. For another example, the electronic device may determine the identity information of the user according to account number information entered by the user, such as determining the identity information of the user according to an ID number, a phone number, a social account number, etc. entered by the user.

Alternatively or additionally, the electronic device may determine the identity information of the user according to one or a combination of the above-mentioned ways. For example, the electronic device may obtain a social account number and an account password entered by a user A, and if the social account number matches the account password, the identity information may be determined as the user A. For another example, the electronic device may perform SMS verification according to a phone number entered by a user B, and after successful SMS verification, obtain facial characteristics of the user B, and if the facial characteristics verification determines that the identity information is the user B, the identity information may be determined as the user B.

Step S2032b, a curvature corresponding to the identity information is obtained from a curvature database as the preset curvature.

The electronic device may be preconfigured with a curvature database, which includes mapping relationships between a plurality of pieces of identity information and a plurality of curvatures. Specifically, the mapping relationships between the plurality of pieces of identity information and the plurality of curvatures may be as shown in Table 2:

TABLE 2

| Identify information | Curvature |
| --- | --- |
| User A | Curvature A |
| User B | Curvature B |

As can be seen, the electronic device may find the curvature corresponding to the identity information according to the identity information of the user obtained currently and Table 2 in the curvature database. For example, if the electronic device identifies the identity information of the user unlocked currently as the user A, the curvature A may be determined as the preset curvature.

Considering that an electronic device may be used by different users, in this implementation, by identifying the identity information of the user and obtaining the curvature corresponding to the identity information from the curvature database as the preset curvature, it is possible to quickly and accurately configure different preset curvatures according to different users.

In other implementations, the user may customize to set the preset curvature on the electronic device. For example, during a stage of fingerprint entry, the electronic device may display a curvature input interface, in which the user can input his or her own customized curvature, and when the user performs fingerprint unlocking on the electronic device next time, the electronic device may use the customized input curvature of the user as the preset curvature.

In step S204, if the extended fingerprint image matches the preset fingerprint image, the electronic device is unlocked.

In some implementations, a specific implementation of step S204 may include: deformation quantity between the fingerprint image and the extended fingerprint image is obtained. If the deformation quantity satisfies a preset deformation quantity condition, it is determined whether the extended fingerprint image matches the preset fingerprint image. If the extended fingerprint image matches the preset fingerprint image, the electronic device is unlocked.

Alternatively or additionally, a two-dimensional fingerprint of an ordinary plane fingerprint extended along longitude and latitude lines has no spherical curvature, the extended image is still the same as the fingerprint image before being extended, without a deformation quantity. If the deformation quantity is greater than a deformation quantity threshold value, it can be determined that the deformation quantity satisfies the preset deformation quantity condition, so as to improve the accuracy of fingerprint identification. Alternatively or additionally, the deformation quantity may be amounts of latitude change, longitude change, etc. between the fingerprint image and the extended fingerprint image.

Figure 9:
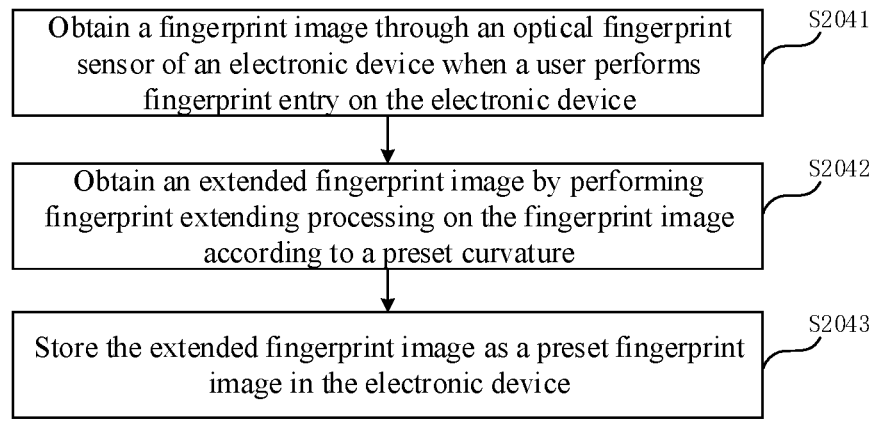
FIG. 9 is a flow diagram of an implementation of step 5204 illustrated according to the example of FIG. 4.

Alternatively or additionally, a standard deformation quantity may be prestored in the electronic device, and if the deformation quantity is consistent with or is not significantly different from the standard deformation quantity, the deformation quantity may be determined to satisfy the preset deformation quantity condition. The standard deformation quantity may be calculated according to a plurality of historical deformation quantities obtained from a plurality of fingerprint extending historical records, specifically an average value of the plurality of historical deformation quantities. In some implementations, as shown in FIG. 9, the preset fingerprint image in step S204 may be obtained as follows:

Step S2041, the fingerprint image is obtained through the optical fingerprint sensor of the electronic device when the user performs fingerprint entry on the electronic device.

Step S2042, the extended fingerprint image is obtained by performing the fingerprint extending processing on the fingerprint image according to the preset curvature.

Step S2043, the extended fingerprint image is stored as the preset fingerprint image in the electronic device.

The specific implementations of steps S2041 to S2043 may be referred to steps S101 to S103, which are not repeated here.

In this implementation, the fingerprint image is obtained through the optical fingerprint sensor of the electronic device when the user performs the fingerprint entry on the electronic device, the fingerprint extending processing is performed according to the preset curvature to obtain the extended fingerprint image, and then the extended fingerprint image is stored as the preset fingerprint image in the electronic device, so that the entered fingerprint image can be guaranteed to have a high anti-counterfeiting capability. In addition, it avoids that the user needs to press the screen extensively for a long time, which can improve the efficiency of fingerprint entry.

After the electronic device obtains the extended fingerprint image, the extended fingerprint image is compared with the preset fingerprint image, and if the extended fingerprint image is determined to be consistent with the preset fingerprint image or the similarity between the two is greater than a preset similarity, the extended fingerprint image can be determined to match the preset fingerprint image, and the electronic device can be unlocked.

Figure 10:
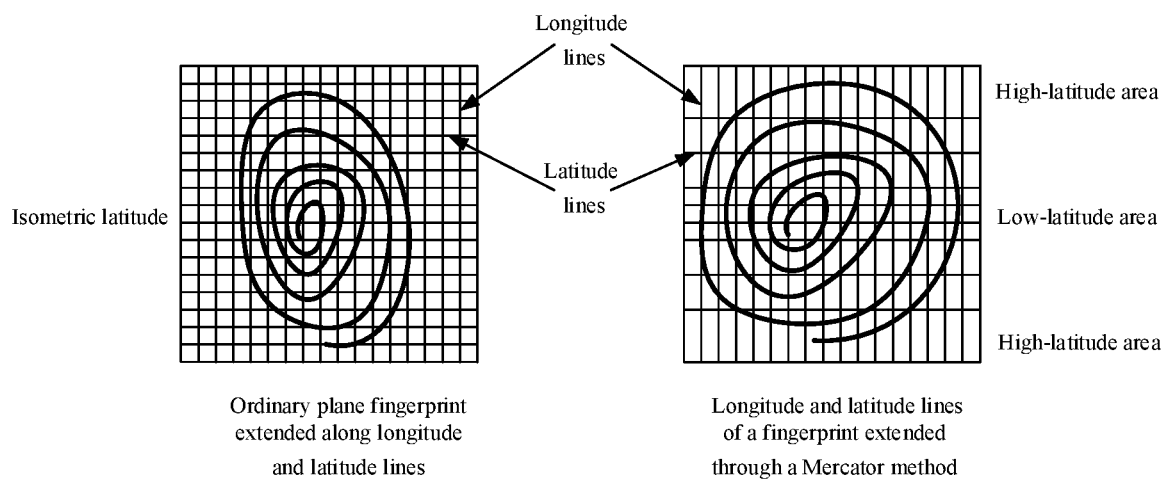
FIG. 10 is a schematic extending diagram of a two-dimensional plane fingerprint image and a three-dimensional fingerprint image according to an example.

As shown in FIG. 10, the left in FIG. 10 is a schematic diagram of a two-dimensional plane fingerprint image after extending using the Mercator method of this example, i.e., a two-dimensional fingerprint of an ordinary plane fingerprint extended along longitude and latitude lines. Since the two-dimensional fingerprint itself has no spherical curvature, the extended image is still the same as the fingerprint image before being extended, there is no difference among the latitude areas after division, and all the latitude areas are equal, there is no distortion of image stretching. The fingerprint image on the right in FIG. 10 is a three-dimensional fingerprint image collected using a three-dimensional finger (i.e., a finger including a curvature), and since the three-dimensional finger is a sphere-like curved surface shape, the three-dimensional fingerprint image will have high and low latitudes on a plane graph after being extended through the Mercator algorithm. High-latitude areas are areas far from an equator line, and the deformation quantities of these areas increase with distances from the equator, which is reflected in an image extended in a plane that fingerprint patterns of the high-latitude areas are elongated. These feature points may be used to prevent counterfeiting because fake fingerprints on the left of the comparison cannot produce high-latitude shape distortions, and can be used to prevent counterfeiting. Alternatively or additionally, when comparing fingerprint images, the electronic device may distinguish whether a collected image deformation is the same as an image deformation to be compared to determine whether the fingerprint is true or false.

In this example, the contact information between the finger of the user and the screen of the electronic device is obtained when the user performs fingerprint unlocking on the electronic device, if the contact information satisfies the preset condition, the fingerprint image is obtained through the optical fingerprint sensor of the electronic device, enabling the optical fingerprint sensor to be turned on for fingerprint image collecting when it is determined that the user has a valid contact. In addition, it avoids that the user needs to press the screen extensively for a long time to collect the fingerprint image like using a traditional fingerprint sensor. When the contact information satisfies the preset condition, the fingerprint image can be collected, which improves the collecting efficiency and shortens the unlocking time.

Figure 11:
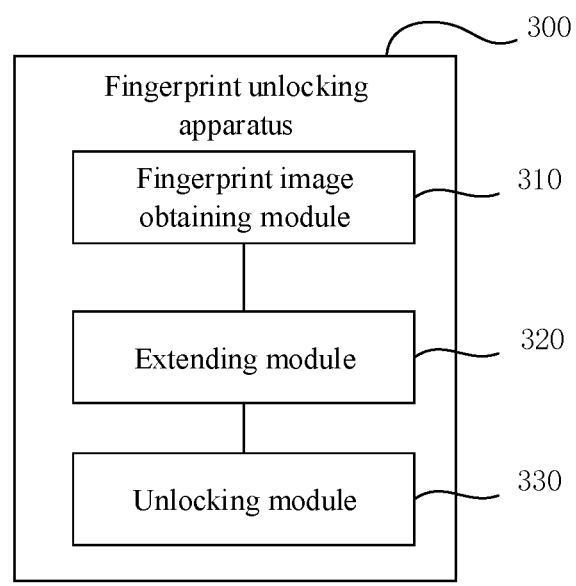
FIG. 11 is a block diagram of a fingerprint unlocking apparatus according to an example.

FIG. 11 is a block diagram of a fingerprint unlocking apparatus according to an example. As shown in FIG. 11, the apparatus 300 includes a fingerprint image obtaining module 310, an extending module 320 and an unlocking module 330.

The fingerprint image obtaining module 310 is configured to obtain a fingerprint image through an optical fingerprint sensor of an electronic device when a user performs fingerprint unlocking on the electronic device.

The extending module 320 is configured to perform fingerprint extending processing on the fingerprint image according to a preset curvature to obtain an extended fingerprint image.

The unlocking module 330 is configured to unlock the electronic device when the extended fingerprint image matches a preset fingerprint image.

In some implementations, the fingerprint image obtaining module 310 includes:

a contact information obtaining submodule, configured to obtain contact information between a finger of the user and a screen of the electronic device; and a fingerprint image obtaining submodule, configured to obtain the fingerprint image through the optical fingerprint sensor of the electronic device when the contact information satisfies a preset condition.

In some implementations, the contact information includes a contact area, and the fingerprint image obtaining module 310 further includes:

a first judging submodule, determining that the contact information satisfies the preset condition when the contact area is greater than or equal to an area threshold value, where the area threshold value is smaller than a contact area when the finger of the user is in full contact with the screen.

In some implementations, the contact information further includes a contact duration, and the fingerprint image obtaining module 310 further includes:

a second judging submodule, configured to determine that the contact information satisfies the preset condition when the contact area is greater than or equal to the area threshold value and the contact duration is greater than or equal to a duration threshold value.

In some implementations, the extending module 320 is specifically configured to: perform the fingerprint extending processing on the fingerprint image according to the preset curvature and a Mercator algorithm to obtain the extended fingerprint image.

In some implementations, the extending module 320 includes:

a coordinate information submodule, configured to obtain coordinate information, corresponding to a preset rectangular coordinate system, of the fingerprint image, where the preset rectangular coordinate system is pre-established on the screen of the electronic device;

a calculating submodule, configured to substitute the coordinate information and the preset curvature into an inverse of the Mercator algorithm for the calculation processing to obtain a longitude and a latitude corresponding to the coordinate information; and a constructing submodule, configured to construct the extended fingerprint image based on the latitude and the longitude.

In some implementations, the unlocking module 330 includes:

a deformation quantity obtaining submodule, configured to obtain a deformation quantity between the fingerprint image and the extended fingerprint image;

a judging submodule, configured to determine whether the extended fingerprint image matches the preset fingerprint image when the deformation quantity satisfies a preset deformation quantity condition; and an unlocking submodule, configured to unlock the electronic device when the extended fingerprint image matches the preset fingerprint image.

In some implementations, the fingerprint unlocking apparatus 300 further includes: a preset curvature determining module, and the preset curvature determining module is configured to: obtain a plurality of sample fingerprint images of the user through the optical fingerprint sensor; obtain a curvature corresponding to each sample fingerprint image to obtain a plurality of sample curvatures; and perform a mean calculation on the plurality of sample curvatures and determine a result of the calculation as the preset curvature.

In some implementations, the preset curvature determining module is further configured to: identify identity information of the user; and obtain a curvature corresponding to the identity information from a curvature database as the preset curvature.

In some implementations, the fingerprint unlocking apparatus 300 further includes an entering module, and the entering module is configured to:

obtain the fingerprint image through the optical fingerprint sensor of the electronic device when the user performs fingerprint entry on the electronic device; perform the fingerprint extending processing on the fingerprint image according to the preset curvature to obtain the extended fingerprint image; and store the extended fingerprint image as the preset fingerprint image in the electronic device.

Regarding the apparatus in the above example, specific ways in which each module performs operations are described in detail in the examples of this method, which is not explained in detail here.

The disclosure also provides a non-transitory computer readable storage medium, on which a computer program instruction is stored, where when the program instruction is executed by a processor, steps of the fingerprint unlocking method provided by the disclosure are realized.

Figure 12:
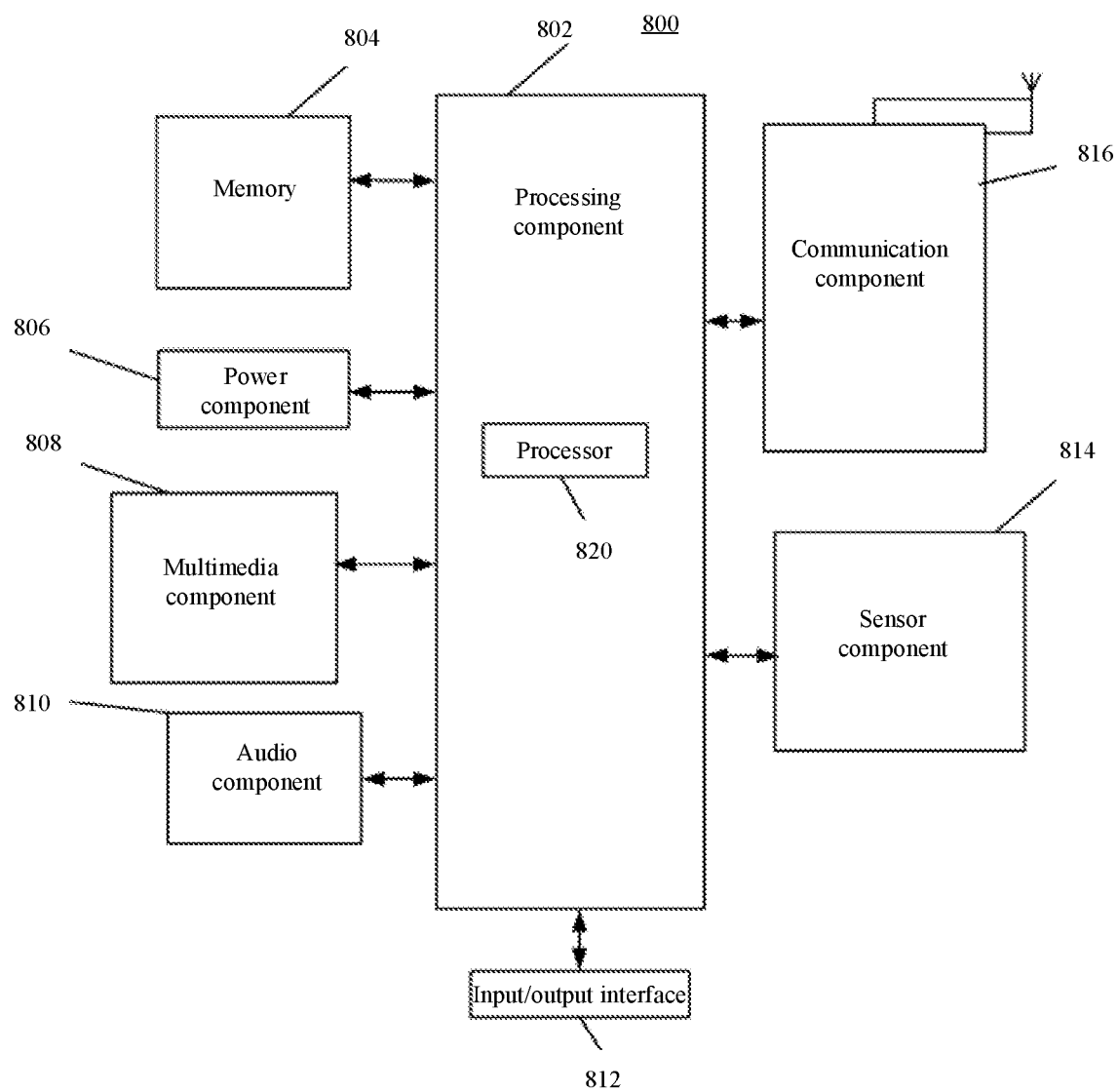
FIG. 12 is a block diagram of an electronic device according to an example.

FIG. 12 is a block diagram of an electronic device 800 according to an example. For example, the electronic device 800 may be a cell phone, a computer, a smart door lock, a tablet device, a smart wearable device, etc.

Referring to FIG. 12, the electronic device 800 may include one or more the following components: a processing component 802, a memory 804, a power component 806, a multimedia component 808, an audio component 810, an interface 812 for input/output (I/O), a sensor component 814, and a communication component 816.

The processing component 802 generally controls the overall operation of the electronic device 800, such as operations associated with display, data processing, data communication, and logging operations. The processing component 802 may include one or more processors 820 to execute instructions to complete all or some of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the electronic device 800. Examples of these data include instructions for any application or method to operate on the electronic device 800, such as a preset fingerprint image, a preset curvature, identity information of a user, an area threshold value, a pressure threshold value and a duration threshold value. The memory 804 may be implemented by any type of volatile or non-volatile storage device or a combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD-ROM.

The power component 806 provides power for various components of the electronic device 800. The power component 806 may include a power management system, one or more power sources, and other components associated with generating, managing, and distributing power for the electronic device 800.

The multimedia component 808 includes a screen that provides an output interface between the electronic device 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense boundaries of touch or swipe action, but also detect a duration and pressure associated with the touch or swipe action. In some examples, the multimedia component 808 includes a front-facing camera and/or a rear-facing camera. The front camera and/or rear camera may receive external multimedia data when the electronic device 800 is in an operating mode, such as shooting mode or video mode. Each front-facing camera and rear-facing camera may be a fixed optical lens system or have a focal length and optical zoom capability.

The audio component 810 is configured to output and/or input audio signals. For example, the audio component 810 includes a microphone (MIC). The microphone is configured to receive external audio signals when the electronic device 800 is in an operating mode, such as a call mode, a record mode, and a voice recognition mode. The received audio signals may be further stored in the memory 804 or sent via the communication component 816. In some examples, the audio component 810 further includes a speaker for outputting audio signals.

The I/O interface 812 provides interfaces between the processing component 802 and peripheral interface modules. The peripheral interface modules may be keypads, click wheels, buttons, etc. These buttons may include, but are not limited to: a home button, a volume button, a start button, and a lock button.

The sensor component 814 includes one or more sensors for providing status assessment of various aspects of the electronic device 800. For example, the sensor component 814 may detect a turning-on/turning-off state of the electronic device 800, the relative positioning of components, such as the components being a display and a keypad of the electronic device 800. The sensor component 814 may also detect a change in position of the electronic device 800 or a component of the electronic device 800, the presence or absence of contact between the user and the electronic device 800, orientation or acceleration/deceleration of the electronic device 800 and temperature changes of the electronic device 800. The sensor component 814 may include a proximity sensor configured to detect the presence of a nearby object without any physical contact. The sensor component 814 may further include a light sensor, such as a CMOS or CCD image sensor, for use in imaging applications. In some examples, the sensor component 814 may further include an acceleration sensor, a gyroscope sensor, a magnetic sensor, a pressure sensor, or a temperature sensor. Alternatively or additionally, the sensor component 814 further includes at least one optical fingerprint sensor and at least one distance sensor array, where the optical fingerprint sensor is used to collect a fingerprint image of the user and the distance sensor array is used to collect a distance between a finger of the user and the screen.

The communication component 816 is configured to facilitate communication between the electronic device 800 and other devices by wired or wireless means. The electronic device 800 may access to a wireless network based on a communication standard, such as WiFi, 2G or 3G, or a combination. In an example, the communication component 816 receives broadcast signals or broadcast-related information from an external broadcast management system via a broadcast channel. In an example, the communication component 816 further includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the electronic device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for perform the above method.

In an example, a non-transitory computer readable storage medium including instructions is also provided, such as the memory 804 including instructions, where the instructions may be executed by the processor 820 of the electronic device 800 to accomplish the above method. For example, the non-transitory computer readable storage medium may be a ROM, a random access memory (RAM), a CD-ROM, a magnetic tape, a floppy disk, and an optical data storage device, etc.

In another example, a computer program product is also provided. The computer program product includes a computer program capable of being executed by a programmable apparatus. The computer program has a code portion for performing the above fingerprint unlocking method when executed by the programmable apparatus.

Other embodiments of the disclosure will be apparent to those skilled in the art from consideration of the specification and practice of the disclosure herein. The application is intended to cover any variations, uses, or adaptations of the disclosure following the general principles and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A fingerprint unlocking method, comprising:
   obtaining a fingerprint image through an optical fingerprint sensor of an electronic device when a user performs fingerprint unlocking on the electronic device;
   obtaining an extended fingerprint image by performing fingerprint extending processing on the fingerprint image according to a preset curvature, wherein the performing the fingerprint extending processing on the fingerprint image according to the preset curvature to obtain the extended fingerprint image comprises:
   obtaining the extended fingerprint image by performing the fingerprint extending processing on the fingerprint image according to the preset curvature and a Mercator algorithm; and unlocking the electronic device in response to determining the extended fingerprint image matches a preset fingerprint image.

2. The fingerprint unlocking method according to claim 1, wherein the obtaining the fingerprint image through the optical fingerprint sensor of the electronic device, comprises:
obtaining contact information between a finger of the user and a screen of the electronic device; and
obtaining the fingerprint image through the optical fingerprint sensor of the electronic device in response to determining the contact information satisfies a preset condition.

3. The fingerprint unlocking method according to claim 2, wherein the contact information comprises a contact area, and the fingerprint unlocking method, further comprises:
determining the contact information satisfies the preset condition in response to determining the contact area is greater than or equal to an area threshold value, wherein the area threshold value is smaller than a contact area when the finger of the user is in full contact with the screen.

4. The fingerprint unlocking method according to claim 3, wherein the contact information further comprises a contact duration, and the fingerprint unlocking method, further comprises:
determining the contact information satisfies the preset condition in response to determining the contact area is greater than or equal to the area threshold value and the contact duration is greater than or equal to a duration threshold value.

5. The fingerprint unlocking method according to claim 1, wherein the performing the fingerprint extending processing on the fingerprint image according to the preset curvature and the Mercator algorithm to obtain the extended fingerprint image, comprises:
obtaining coordinate information, corresponding to a preset rectangular coordinate system of the fingerprint image, wherein the preset rectangular coordinate system is pre-established for a screen of the electronic device;
obtaining a longitude and a latitude corresponding to the coordinate information by substituting the coordinate information and the preset curvature into an inverse of the Mercator algorithm for calculation processing; and
constructing the extended fingerprint image based on the latitude and the longitude.

6. The fingerprint unlocking method according to claim 1, wherein the unlocking the electronic device in response to determining the extended fingerprint image matches the preset fingerprint image, comprises:
obtaining a deformation quantity between the fingerprint image and the extended fingerprint image;
determining whether the extended fingerprint image matches the preset fingerprint image in response to determining the deformation quantity satisfies a preset deformation quantity condition; and
unlocking the electronic device in response to determining the extended fingerprint image matches the preset fingerprint image.

7. The fingerprint unlocking method according to claim 1, before the performing the fingerprint extending processing on the fingerprint image according to the preset curvature to obtain the extended fingerprint image, further comprising:
obtaining more than one sample fingerprint image of the user through the optical fingerprint sensor;
obtaining more than one sample curvature by obtaining a curvature corresponding to each sample fingerprint image; and
performing a mean calculation on the more than one sample curvatures and determining a result of the mean calculation as the preset curvature.

8. The fingerprint unlocking method according to claim 1, before the performing the fingerprint extending processing on the fingerprint image according to the preset curvature to obtain the extended fingerprint image, further comprising:
identifying identity information of the user; and
obtaining a curvature corresponding to the identity information from a curvature database as the preset curvature.

9. The fingerprint unlocking method according to claim 1, wherein the preset fingerprint image is obtained as follows:
obtaining the fingerprint image through the optical fingerprint sensor of the electronic device when the user performs fingerprint entry on the electronic device;
obtaining the extended fingerprint image by performing the fingerprint extending processing on the fingerprint image according to the preset curvature; and
storing the extended fingerprint image as the preset fingerprint image in the electronic device.

10. An electronic device, comprising:
a processor;
a memory, used to store instructions executable by the processor; and
an optical fingerprint sensor, used to collect a fingerprint image; wherein the processor is configured to:
control the optical fingerprint sensor of the electronic device to obtain the fingerprint image when a user performs fingerprint unlocking on the electronic device;
obtain an extended fingerprint image by performing fingerprint extending processing on the fingerprint image according to a preset curvature to obtain an extended fingerprint image, wherein the performing the fingerprint extending processing on the fingerprint image according to the preset curvature to obtain the extended fingerprint image, comprises: obtaining the extended fingerprint image by performing the fingerprint extending processing on the fingerprint image according to the preset curvature and a Mercator algorithm; and
unlock the electronic device in response to determining the extended fingerprint image matches a preset fingerprint image.

11. The electronic device according to claim 10, wherein the processor is configured to:
obtain contact information between a finger of the user and a screen of the electronic device; and
obtain the fingerprint image through the optical fingerprint sensor of the electronic device when the contact information satisfies a preset condition.

12. The electronic device according to claim 11, wherein the contact information comprises a contact area, and the processor is further configured to:
determine that the contact information satisfies the preset condition when the contact area is greater than or equal to an area threshold value, wherein the area threshold value is smaller than a contact area when the finger of the user is in full contact with the screen.

13. The electronic device according to claim 12, wherein the contact information further comprises a contact duration, and the processor is further configured to:
determine that the contact information satisfies the preset condition when the contact area is greater than or equal to the area threshold value and the contact duration is greater than or equal to a duration threshold value.

14. The electronic device according to claim 10, wherein the processor is configured to:
   obtain coordinate information, corresponding to a preset rectangular coordinate system, of the fingerprint image, wherein the preset rectangular coordinate system is pre-established on a screen of the electronic device;
   obtain a longitude and a latitude corresponding to the coordinate information by substituting the coordinate information and the preset curvature into an inverse of the Mercator algorithm for calculation processing; and
   construct the extended fingerprint image based on the latitude and the longitude.

15. The electronic device according to claim 10, wherein the processor is configured to:
   obtain a deformation quantity between the fingerprint image and the extended fingerprint image;
   determine whether the extended fingerprint image matches the preset fingerprint image when the deformation quantity satisfies a preset deformation quantity condition; and
   unlock the electronic device when the extended fingerprint image matches the preset fingerprint image.

16. The electronic device according to claim 10, wherein the processor is further configured to:
   obtain more than one sample fingerprint image of the user through the optical fingerprint sensor before the performing the fingerprint extending processing on the fingerprint image according to the preset curvature to obtain the extended fingerprint image;
   obtain more than one sample curvature by obtaining a curvature corresponding to each sample fingerprint image; and
   perform a mean calculation on the more than one sample curvatures and determine a result of the mean calculation as the preset curvature.

17. The electronic device according to claim 10, wherein the processor is further configured to:
   identify identity information of the user before the performing the fingerprint extending processing on the fingerprint image according to the preset curvature to obtain the extended fingerprint image; and
   obtain a curvature corresponding to the identity information from a curvature database as the preset curvature.

18. A non-transitory computer readable storage medium, storing a computer program instructions, wherein when the computer program instructions when executed by a processor cause the processor to execute the method according to claim 1.

* * * * *

UNITED STATES PATENT AND TRADEMARK OFFICE
CERTIFICATE OF CORRECTION

| | |
|---|---|
| PATENT NO. | : 11,670,107 B2 |
| APPLICATION NO. | : 17/681099 |
| DATED | : June 6, 2023 |
| INVENTOR(S) | : Ning Hao |

It is certified that error appears in the above-identified patent and that said Letters Patent is hereby corrected as shown below:

In the Specification

In Column 2, Line 18, delete "5203" and insert -- S203 --, therefor.
In Column 2, Line 20, delete "5203" and insert -- S203 --, therefor.
In Column 2, Line 22, delete "5204" and insert -- S204 --, therefor.
In Column 7, Line 47, delete "earth." and insert -- Earth. --, therefor.
In Column 8, Line 22, delete "to according to the" and insert -- to the --, therefor.
In Column 14, Line 31, delete "more the" and insert -- more of the --, therefor.

Signed and Sealed this
Twenty-fourth Day of October, 2023

Katherine Kelly Vidal
*Director of the United States Patent and Trademark Office*